April 30, 1940.  R. M. HAZEN ET AL  2,198,771
WELDED TWO-PIECE LIGHT ALLOY PISTON
Original Filed April 19, 1937
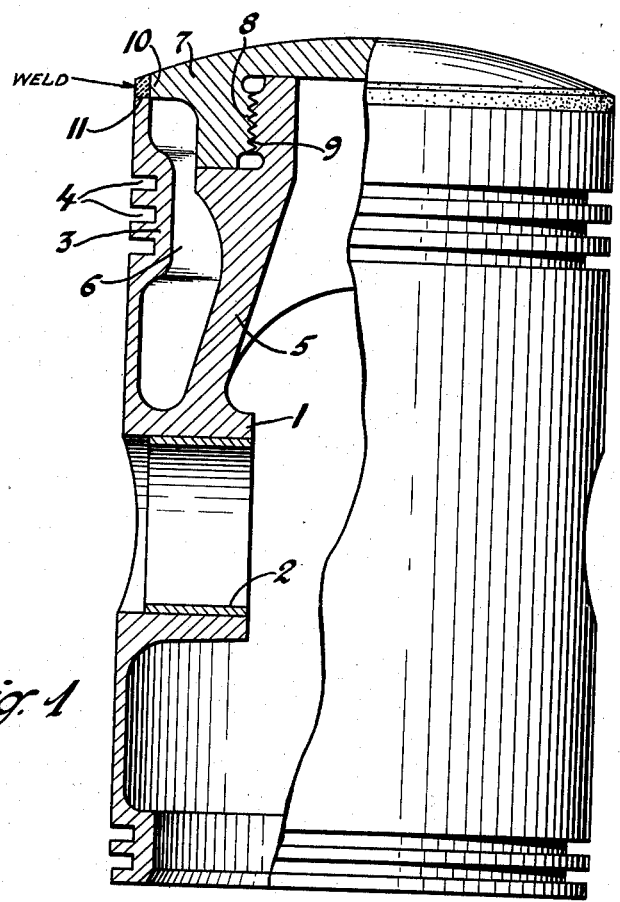
Fig. 1
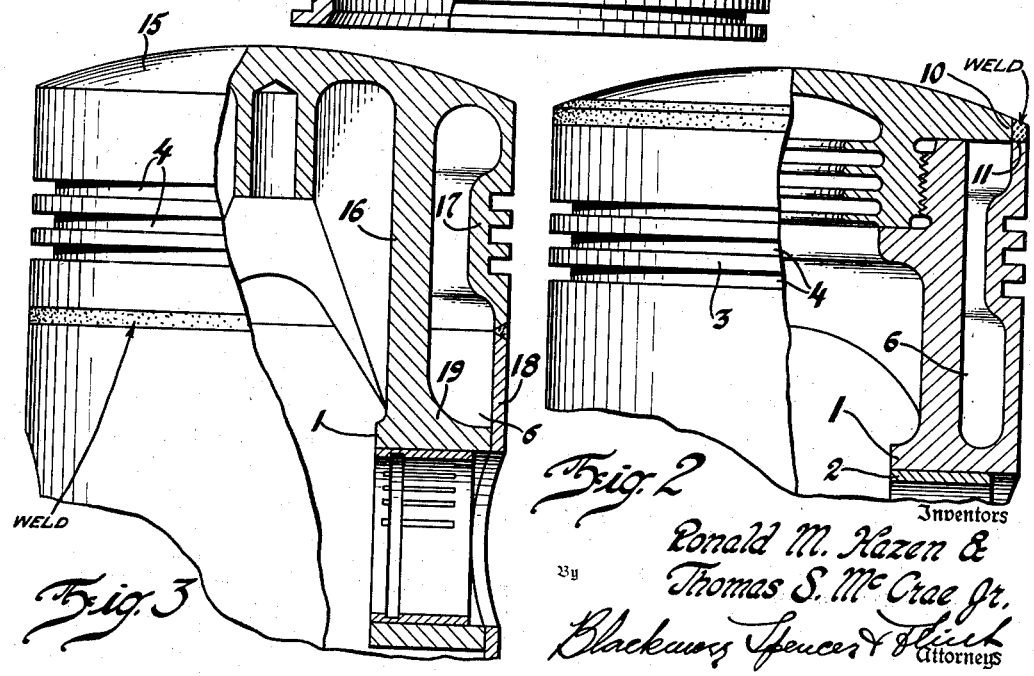
Fig. 2
Fig. 3
Inventors
Ronald M. Hazen &
Thomas S. McCrae Jr.
By Blackmore Spencer & Flint
Attorneys Patented Apr. 30, 1940

2,198,771

UNITED STATES PATENT OFFICE 2,198,771

WELDED TWO-PIECE LIGHT ALLOY PISTON

Ronald M. Hazen and Thomas S. McCrae, Jr., Indianapolis, Ind., assignors to General Motors Corporation, Detroit, Mich., a corporation of Delaware Original application April 19, 1937, Serial No. 137,656. Divided and this application March 27, 1939, Serial No. 264,380

4 Claims. (Cl. 123—176)

This application is a division of our Patent No. 2,159,989 issued May 30, 1939.

The invention relates to pistons and especially to light alloy pistons for high-speed engines.

It relates particularly to such pistons for use in internal combustion engines.

In modern high-speed two-cycle engines, the conditions under which the pistons have to operate are particularly severe. Other things being equal, the specific output of a two-cycle engine is twice that of a four-cycle engine and there is approximately twice the waste heat to be dissipated through the parts in a given time. The high thermal conditions not only frequently cause difficulties due to ring sticking, but decrease the strength of the piston to the point where failure may occur.

Accordingly, it is becoming increasingly important to provide pistons which are light, but of adequate strength, while capable of dissipating effectively the heat to which they are subjected.

The object of the invention is a strong, light weight piston, capable of quickly dissipating the heat to which it is subjected.

Another object of the invention is a piston in which the heat flow to the ring belt is limited.

It is a further object of the invention to achieve the foregoing objects in a piston which can be simply and cheaply produced.

The above and other objects of the invention will be apparent as the description proceeds.

According to the invention, the crown of the piston is supported from the piston pin bosses mainly by a circular strut forming an inner wall, spaced from and of greater section than the outer wall of the piston and providing an annular insulating air space between the two walls. The piston is made in two pieces subsequently fastened together by screwed and/or welded joints, or the like. One piece forms one part of the wall of the annular insulating air space and includes the ring belt area and the strut and the other piece forms the remaining part of the wall of the annular insulating air space and includes the remainder of the piston.

The two-piece construction permits a greater control and freedom in the choice of section and in the provision of suitable cooling fins and insulating air spaces.

The drawing shows three modifications of a piston according to the invention.

In the drawing:

Fig. 1 is a view, partly in elevation and partly in section, of a piston structure according to the invention.

Figs. 2 and 3 are views, partly in elevation and partly in section of modifications according to the invention.

Referring now to Fig. 1, the piston is provided with diametrically opposite bosses such as 1, having bearings 2 for a piston pin (not shown). Integral with the bosses 1 and above the bosses is a ring belt area 3 in which grooves 4 are provided for conventional packing rings (not shown) and a circular strut 5 having an outer diameter such as to leave an annular space 6 between the ring belt area 3 and the strut 5.

The piston crown 7 forms the closure for the upper end of the annular space 6. It has female threads 8 engaging male threads 9 at the top end of the circular strut 5. The peripheral rim 10 of the piston crown extends to the top edge 11 of the piston skirt above the ring belt area 3.

The piston structure is completed by screwing the two parts together, after which the joint between the rim 10 of the piston crown and the top edge 11 is sealed by welding as indicated in the drawing.

The construction according to Fig. 2 is essentially similar to the construction according to Fig. 1, except that the circular strut is female threaded and the piston crown is male threaded.

In the modifications according to Fig. 3, the piston crown 15 is integral with the circular strut 16 and the ring belt area 17. The piston skirt portion 18 is a push fit over the bosses 19 which are integral with the circular strut 16 and the ring belt area 17 as in the structure according to Fig. 1. The skirt portion 18 is welded to the ring belt area 17 as shown.

In all the examples illustrated, the annular space extends closer to the outer cylindrical surface of the piston at points above and below the ring belt area in the outer wall of the piston and has at all points a greater cross-sectional area than points above and below the ring belt area. The heat flow from the head of the piston to the ring belt area is restricted by the narrow section of metal between these two parts. The circular strut forming the inner wall of the insulating annular space is sufficiently large to carry the main gas pressure loads and the heat flow directly on to the piston pin bosses—only a small part of the load and the heat flow being transmitted through the outer section of the piston.

Because of the lower temperature of the ring belt area, due to the lessened heat flow to this part, the possibility of piston rings sticking, consequent on carbonization of the lubricating oil at the temperature which would otherwise exist, is avoided.

The two parts of the piston can be made of any suitable light alloy (either forged or cast), and it will be seen that a structure has been provided in which all critical points, as well as the cooling fins, may be completely machined to any desired tolerance limits before assembly.

We claim:

1. In a piston having a crown, a skirt, piston pin bosses, and a ring belt area in the outer wall of the piston between the crown and the piston pin bosses, a strut to support the crown from the piston pin bosses and forming an inner wall spaced from the outer wall of the piston to provide an enclosed annular insulating air space between the ring belt area and the strut forming the inner wall, said inner wall having at all points a greater cross-sectional area than points above and below the ring belt area in the outer wall of the piston, whereby only small portions of the gas pressure loads and the heat to which the crown is exposed in an engine cylinder are transmitted to the ring belt area, and the main portions of the gas pressure loads and the heat flow are carried directly through the inner wall to the piston pin bosses, said piston consisting of a plurality of pieces fastened together, one of said pieces forming a part of the wall of the annular insulating air space and including the ring belt area and the strut, there being a joint in the outer periphery of the piston above the piston pin bosses, between said piece and the remainder of the piston.

2. The combination according to claim 1, in which the ring belt area and the strut are part of the piece including the skirt.

3. The combination according to claim 1, in which the ring belt area, the strut and the piston pin bosses are part of the piece including the crown.

4. The combination according to claim 1, in which the joint in the outer periphery of the piston above the piston pin bosses is a welded joint, and there is an additional screw threaded connection between the two pieces.

RONALD M. HAZEN.
THOMAS S. McCRAE, Jr.